(12) United States Patent
Kitamura

(10) Patent No.: US 12,099,413 B2
(45) Date of Patent: Sep. 24, 2024

(54) MEMORY CONTROLLER, INFORMATION PROCESSING APPARATUS, AND INFORMATION PROCESSING METHOD

(71) Applicant: Fujitsu Limited, Kawasaki (JP)

(72) Inventor: Yasuhiro Kitamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 69 days.

(21) Appl. No.: 18/101,875

(22) Filed: Jan. 26, 2023

(65) Prior Publication Data

US 2023/0315573 A1    Oct. 5, 2023

(30) Foreign Application Priority Data

Mar. 30, 2022 (JP) ................ 2022-057715

(51) Int. Cl.
| | | |
|---|---|---|
| G06F 11/00 | (2006.01) | |
| G06F 9/30 | (2018.01) | |
| G06F 11/07 | (2006.01) | |
| G06F 11/14 | (2006.01) | |

(52) U.S. Cl.
CPC ...... *G06F 11/1405* (2013.01); *G06F 9/30079* (2013.01); *G06F 11/0772* (2013.01); *G06F 11/141* (2013.01)

(58) Field of Classification Search
CPC ............ G06F 11/0772; G06F 11/1405; G06F 11/141; G06F 9/30079
See application file for complete search history.

(56) References Cited

U.S. PATENT DOCUMENTS

| | | | | |
|---|---|---|---|---|
| 6,976,204 | B1 * | 12/2005 | Chambers ............ | G11C 7/1006 714/763 |
| 2014/0281679 | A1 * | 9/2014 | Giroux ................ | G06F 11/141 714/6.1 |
| 2014/0380096 | A1 * | 12/2014 | Dodson ................ | G11C 29/42 714/16 |

FOREIGN PATENT DOCUMENTS

JP    1-140357 A    6/1989

* cited by examiner

*Primary Examiner* — Marc Duncan
(74) *Attorney, Agent, or Firm* — WHDA, LLP

(57) ABSTRACT

A memory controller includes a request pipeline and a retry control circuit. The request pipeline receives an input of a request to a memory output from a processor core, stores the request, and causes the memory to process the request in order of storage. The retry control circuit stops a new request input to the request pipeline when an error occurs in the memory, and re-inputs, to the request pipeline, requests to be retried that includes the request in which the error has occurred and a subsequent request stored in the request pipeline.

6 Claims, 13 Drawing Sheets

FIG. 5

| Valid | INDICATING WHETHER ENTRY IS VALID OR INVALID |
|---|---|
| COMMAND | INDICATING READ OR WRITE |
| ADDRESS | INDICATING MEMORY ADDRESS TO BE ACCESSED |

FIG. 6

| Valid | INDICATING WHETHER REQUEST IS STORED IN STAGE |
|---|---|
| COMMAND | INDICATING READ OR WRITE |
| ADDRESS | INDICATING MEMORY ADDRESS TO BE ACCESSED |
| SEQUENCE NUMBER | NUMBER ASSIGNED TO REQUEST, INDICATING NUMBER OF REQUEST RETRIES<br>INITIAL VALUE IS 0, INCREMENTED AS<br>0 → 1 → 2 → 3 → 0 FOR EACH RETRY |
| COMPLETE FLAG | INDICATING REQUEST EXCEEDS RETRY WINDOW AND REQUEST PROCESSING COMPLETION IS GUARANTEED |

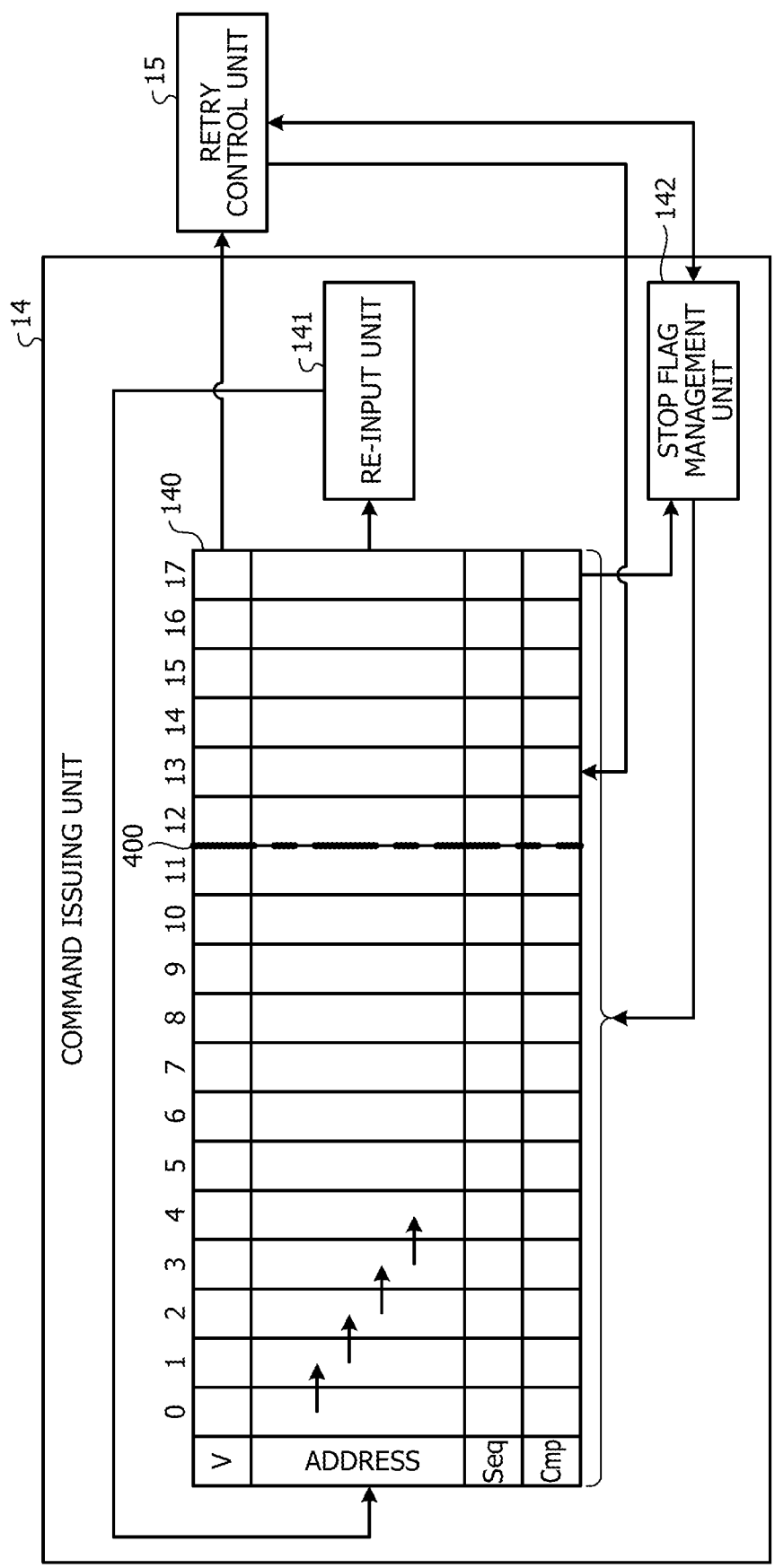

211
| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 0 | 0 | 0 | 0 | 0 | 0 | 1 | 1 | 1 | 1 | 1 | 1 | 1 | 1 | 1 | 1 | 1 | 1 |
| ADDRESS | | | | | | | A14 | A13 | A12 | A11 | A10 | A9 | A8 | A7 | A6 | A5 | A4 | A3 |
| Seq | | | | | | | 1 | 1 | 1 | 1 | 1 | 1 | 1 | 1 | 1 | 1 | 1 | 1 |
| Cmp | | | | | | | 0 | 0 | 0 | 0 | 0 | 0 | 0 | 0 | 0 | 0 | 0 | 0 |

STOP FLAG=1
RETRY NUMBER=2
STOP ENABLE NUMBER=1
STOP NUMBER=1

212
| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 1 | 0 | 0 | 0 | 0 | 0 | 0 | 1 | 1 | 1 | 1 | 1 | 1 | 1 | 1 | 1 | 1 | 1 |
| ADDRESS | A3 | | | | | | | A14 | A13 | A12 | A11 | A10 | A9 | A8 | A7 | A6 | A5 | A4 |
| Seq | 2 | | | | | | | 1 | 1 | 1 | 1 | 1 | 1 | 1 | 1 | 1 | 1 | 1 |
| Cmp | 0 | | | | | | | 0 | 0 | 0 | 0 | 0 | 0 | 0 | 0 | 0 | 0 | 0 |

STOP FLAG=0
RETRY NUMBER=2
STOP ENABLE NUMBER=0
STOP NUMBER=2

213
| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 1 | 1 | 1 | 1 | 1 | 1 | 1 | 0 | 0 | 0 | 0 | 0 | 1 | 1 | 1 | 1 | 1 | 1 |
| ADDRESS | A9 | A8 | A7 | A6 | A5 | A4 | A3 | | | | | | A14 | A13 | A12 | A11 | A10 | |
| Seq | 2 | 2 | 2 | 2 | 2 | 2 | 2 | | | | | | 1 | 1 | 1 | 1 | 1 | |
| Cmp | 0 | 0 | 0 | 0 | 0 | 0 | 0 | | | | | | 0 | 0 | 0 | 0 | 0 | |

STOP FLAG=0
RETRY NUMBER=2
STOP ENABLE NUMBER=0
STOP NUMBER=2

214
| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 0 | 0 | 0 | 0 | 0 | 0 | 1 | 1 | 1 | 1 | 1 | 1 | 1 | 1 | 1 | 1 | 1 | 1 |
| ADDRESS | | | | | | | A14 | A13 | A12 | A11 | A10 | A9 | A8 | A7 | A6 | A5 | A4 | A3 |
| Seq | | | | | | | 2 | 2 | 2 | 2 | 2 | 2 | 2 | 2 | 2 | 2 | 2 | 2 |
| Cmp | | | | | | | 0 | 0 | 0 | 0 | 0 | 0 | 1 | 1 | 1 | 1 | 1 | 1 |

STOP FLAG=0
RETRY NUMBER=2
STOP ENABLE NUMBER=0
STOP NUMBER=2

215
| | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| V | 0 | 0 | 0 | 0 | 0 | 0 | 0 | 0 | 0 | 0 | 0 | 0 | 0 | 0 | 0 | 0 | 0 | 1 |
| ADDRESS | | | | | | | | | | | | | | | | | | A14 |
| Seq | | | | | | | | | | | | | | | | | | 2 |
| Cmp | | | | | | | | | | | | | | | | | | 1 |

STOP FLAG=0
RETRY NUMBER=2
STOP ENABLE NUMBER=0
STOP NUMBER=2

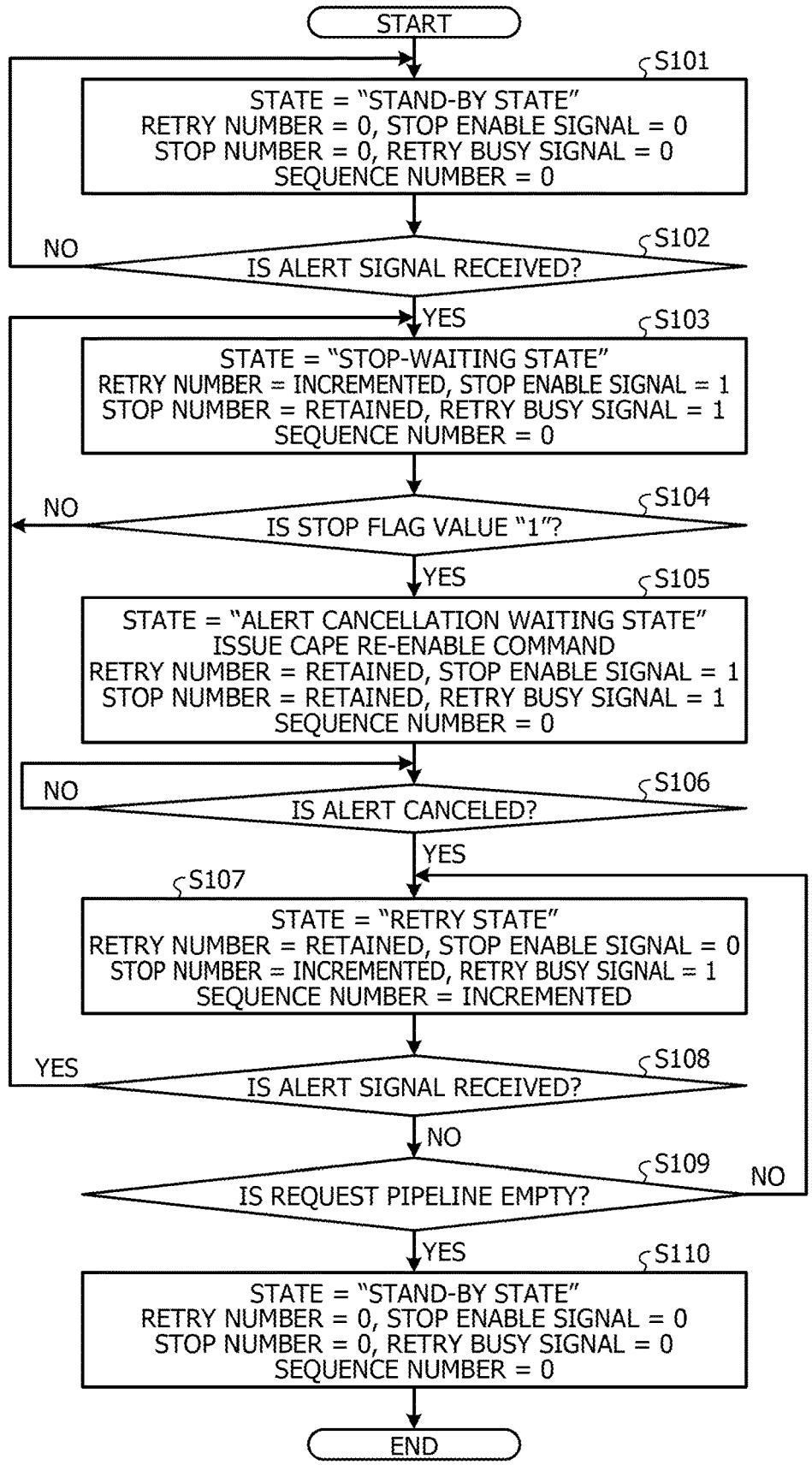

MEMORY CONTROLLER, INFORMATION PROCESSING APPARATUS, AND INFORMATION PROCESSING METHOD

CROSS-REFERENCE TO RELATED APPLICATION

This application is based upon and claims the benefit of priority of the prior Japanese Patent Application No. 2022-57715, filed on Mar. 30, 2022, the entire contents of which are incorporated herein by reference.

FIELD

The embodiment discussed herein is related to a memory controller, an information processing apparatus, and an information processing method.

BACKGROUND

A command address bus of a dual inline memory module (DIMM) is provided with a redundant bit (parity bit) for error detection. In the DIMM, an error called a command address bus parity error (CAPE) may occur due to data inversion caused by noise during a command transfer or the like. A command in which the CAPE has occurred is discarded in the DIMM, and the occurrence of the CAPE is notified to the memory controller via an input/output (I/O) controller with an alert signal. Then, the memory controller that has been notified of the occurrence of the CAPE executes a command retry called a CAPE retry, thereby making it possible to continue operation for the error during the command transfer.

A timing relationship between the access to the DIMM and the occurrence of the CAPE will be described. The memory controller issues an ACTIVE command at a start of request processing. Then, after an ACT to internal read or write delay time (tRCD) has elapsed, the memory controller issues a read command or a write command according to the operation. When a parity check is performed to detect occurrence of the CAPE when any of the ACTIVE command, read command, and write command reaches the DIMM, the occurrence of the CAPE is notified to the memory controller with an alert signal.

Here, since there is a time lag between the request processing start and the alert signal notification, the memory controller sequentially proceeds with the request processing during the time. The DIMM continues to discard commands from the CAPE occurrence until issuance of a CAPE re-enable command from the memory controller for executing the CAPE retry. All requests processed in the controller during that time are subject to the retry.

In this manner, since there is a time lag between the request processing start and the CAPE retry processing start when the CAPE has occurred, requests are retained in some resources until the request command processing is complete in preparation for occurrence of the CAPE. The period of time from the request processing start to the command processing completion is called a retry window. For example, there is a technique of having a state machine in a request queue for selecting a request and retaining requests in the request queue until the requests exceed the retry window.

Furthermore, as a technique of retrying requests when an error occurs, there is a technique of storing, when an error occurs in memory access, requests in a data buffer in the selection order in a switching circuit and reading the requests from the data buffer in the selection order when the requests enter a state where the retry is executable.

Japanese Laid-open Patent Publication No. 01-140357 is disclosed as related art.

SUMMARY

According to an aspect of the embodiments, a memory controller including: a request pipeline that receives an input of a request to a memory output from a processor core, stores the request, and causes the memory to process the request in order of storage; and a retry control unit circuit that stops a new request input to the request pipeline when an error occurs in the memory, and re-inputs, to the request pipeline, a subsequent requests to be retried that includes the request in which the error has occurred and a subsequent request stored in the request pipeline.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating contents of each entry in a request queue;
FIG. 6 is a diagram illustrating information stored in each stage of a request pipeline;
FIG. 7 is a block diagram of a command issuing unit;
FIG. 9 is a first diagram for explaining shift operation of the request pipeline;
FIG. 10 is a second diagram for explaining the shift operation of the request pipeline;
FIG. 11 is a third diagram for explaining the shift operation of the request pipeline;
FIG. 13 is a flowchart of the retry process performed by the retry control unit and the request pipeline.

DESCRIPTION OF EMBODIMENTS

When requests that may be subject to the retry are allowed to stay in the request queue, the memory controller is to retain the requests in the request queue until the requests exceed the retry window. As a result, entries reserved for improving efficiency of out-of-order processing are filled with the requests that have already input to the pipeline, which may lower the efficiency of the out-of-order processing. Furthermore, the number of entries is to be increased to maintain the efficiency of the out-of-order processing, which increases the amount of material and increases the circuit scale.

Moreover, it is conceivable to add a circuit for retaining requests in the request queue, and in that case, the circuit scale of the request queue increases. Since the size of the request queue is directly linked to the request processing performance, it is preferable to reduce the circuit scale.

Furthermore, operation of a busy check circuit, which matches addresses of individual entries in the request queue and request pipeline and executes out-of-order, is also directly linked to the performance. Since the busy check circuit checks all entries regardless of whether they are waiting for a retry or new requests, the busy check circuit becomes complex when requests waiting for a retry and new requests mixedly exist in the request queue, which may lead to an increase in circuit scale or a decrease in performance.

Moreover, according to a technique of retaining requests in a separately prepared retry buffer and retiring them from the request queue, the retry buffer causes an increase in the amount of material. Furthermore, since the number of entries in this buffer is a time difference of the CAPE retry, it tends to increase as a frequency increases, which increases the amount of material and the circuit scale as the performance improves.

The disclosed technique has been conceived in view of the above, and aims to provide a memory controller, an information processing device, and an information processing method that improve performance of request processing while reducing a circuit scale.

Hereinafter, an embodiment of a memory controller, an information processing device, and an information processing method disclosed in the present application will be described in detail with reference to the drawings. Note that the following embodiment does not limit the memory controller, the information processing device, and the information processing method disclosed in the present application.

First Embodiment

Figure 1:
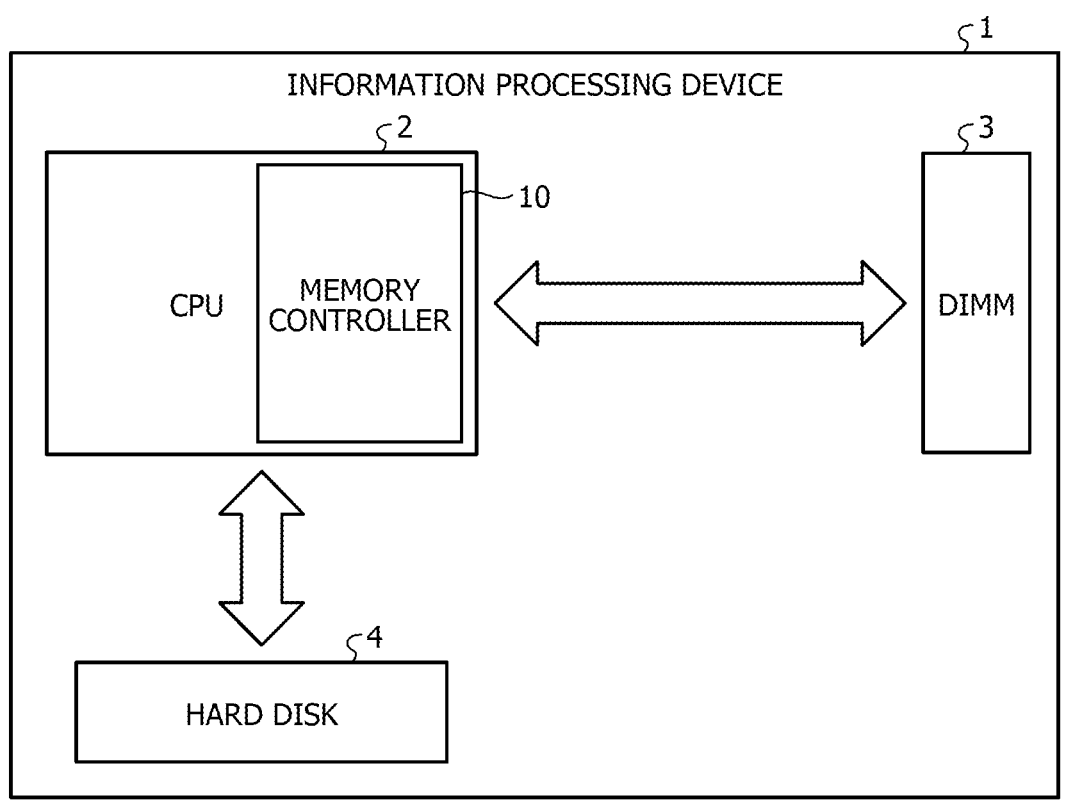
FIG. 1 is a configuration diagram of an information processing device.

FIG. 1 is a configuration diagram of an information processing device. An information processing device 1 includes a central processing unit (CPU) 2, a DIMM 3, and a hard disk 4.

The CPU 2 is connected to the DIMM 3 and the hard disk 4. Furthermore, the CPU 2 includes a memory controller 10. The memory controller 10 controls the DIMM 3 as a main memory, and processes a request from the CPU 2 to the DIMM 3.

The DIMM 3 has a redundant bit for error detection, which is called a parity bit, in a command address bus.

Figure 2:
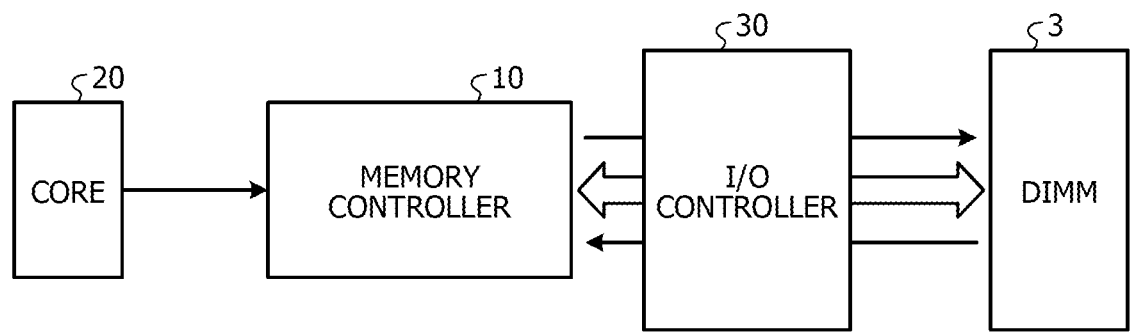
FIG. 2 is a diagram illustrating peripheral circuits of a memory controller.

FIG. 2 is a diagram illustrating peripheral circuits of the memory controller. The memory controller 10 is connected to a core 20 included in the CPU 2 via a bus. One or a plurality of the cores 20 is included in one CPU 2. Furthermore, the memory controller 10 is connected to an I/O controller 30 included in the CPU 2. Then, the memory controller 10 communicates with the DIMM 3 via the I/O controller 30.

The memory controller 10 receives a memory access request from the core 20. Then, the memory controller 10 converts the obtained request to a memory access command. Thereafter, the memory controller 10 accesses the DIMM 3 to transmit the command through the I/O controller 30. In a case of a write command, the memory controller 10 transmits write data to the DIMM 3 through the I/O controller 30. Furthermore, in a case of a read command, the memory controller 10 receives read data from the DIMM 3 through the I/O controller 30. The memory controller 10 processes the request using a request pipeline, which is an instruction pipeline.

The DIMM 3 receives the command transmitted from the memory controller 10. The redundant bit is added to the command address bus for obtaining the command, and the DIMM 3 performs a parity check on the command address bus at the time of receiving the command. When no CAPE occurs, the DIMM 3 processes the command. For example, the DIMM 3 writes data to the specified address in the case of the write command, and reads data from the specified address to output it to the memory controller 10 in the case of the read command.

When a parity error occurs, the DIMM 3 discards the command in which the parity error has occurred. Moreover, the DIMM 3 transmits an alert signal to the memory controller 10 through the I/O controller 30. As a result, the DIMM 3 notifies the memory controller 10 of the occurrence of the CAPE. The DIMM 3 continues to discard commands until a CAPE re-enable command is issued from the memory controller 10. The CAPE re-enable command is a command for canceling an alert. Upon reception of the CAPE re-enable command, the DIMM 3 is enabled to accept a new command, and resumes processing of the accepted command.

Figure 3:
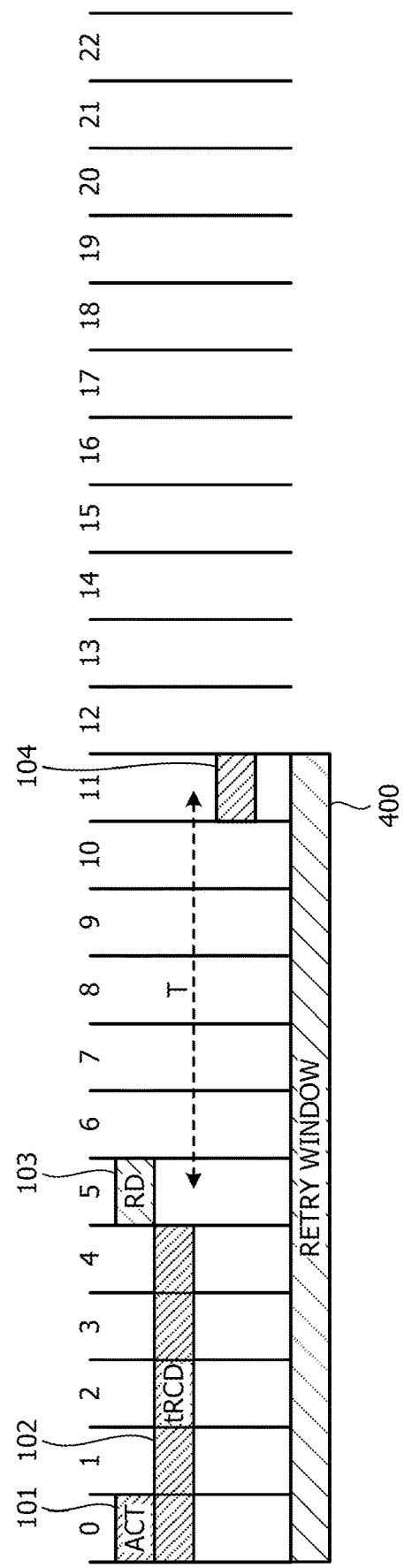
FIG. 3 is a time chart of alert generation.

FIG. 3 is a time chart of alert generation. In FIG. 3, the horizontal axis represents passage of time, and the vertical axis represents each of clocks, commands, and alert signals. The numbers written at the top of the page of FIG. 3 represent the clocks. Each time one clock advances, the stage of the request stored in the request pipeline included in the memory controller 10 advances one by one. For example, the clock numbers in FIG. 3 correspond to the individual stages in the request pipeline.

When a request is input to the request pipeline at the zeroth clock, the memory controller 10 issues an ACT command 101 to the DIMM 3 via the I/O controller 30. Then, when tRCD 102, which is the minimum cycle number interval from the issuance of the ACT command 101 to issuance of a read command or write command, has elapsed, the memory controller 10 issues a read command or write command according to the operation specified by the request. Here, the memory controller 10 issues a read command 103. For example, tRCD is 5 clocks in FIG. 3. Thereafter, when a CAPE occurs, the memory controller 10 receives an alert signal 104 from the DIMM 3 via the I/O controller 30 at that time. In FIG. 3, the timing of receiving the alert signal when the CAPE occurs is the 11th clock. In this case, a retry window 105 is a period of 12 clocks from the zeroth clock to the 11th clock. Since the occurrence of the CAPE ceases when the period of the retry window 105 has passed, the memory controller 10 considers that the command processing is complete, and is allowed to discard the request that has generated the read command 103 and to exclude it from retry targets.

Figure 4:
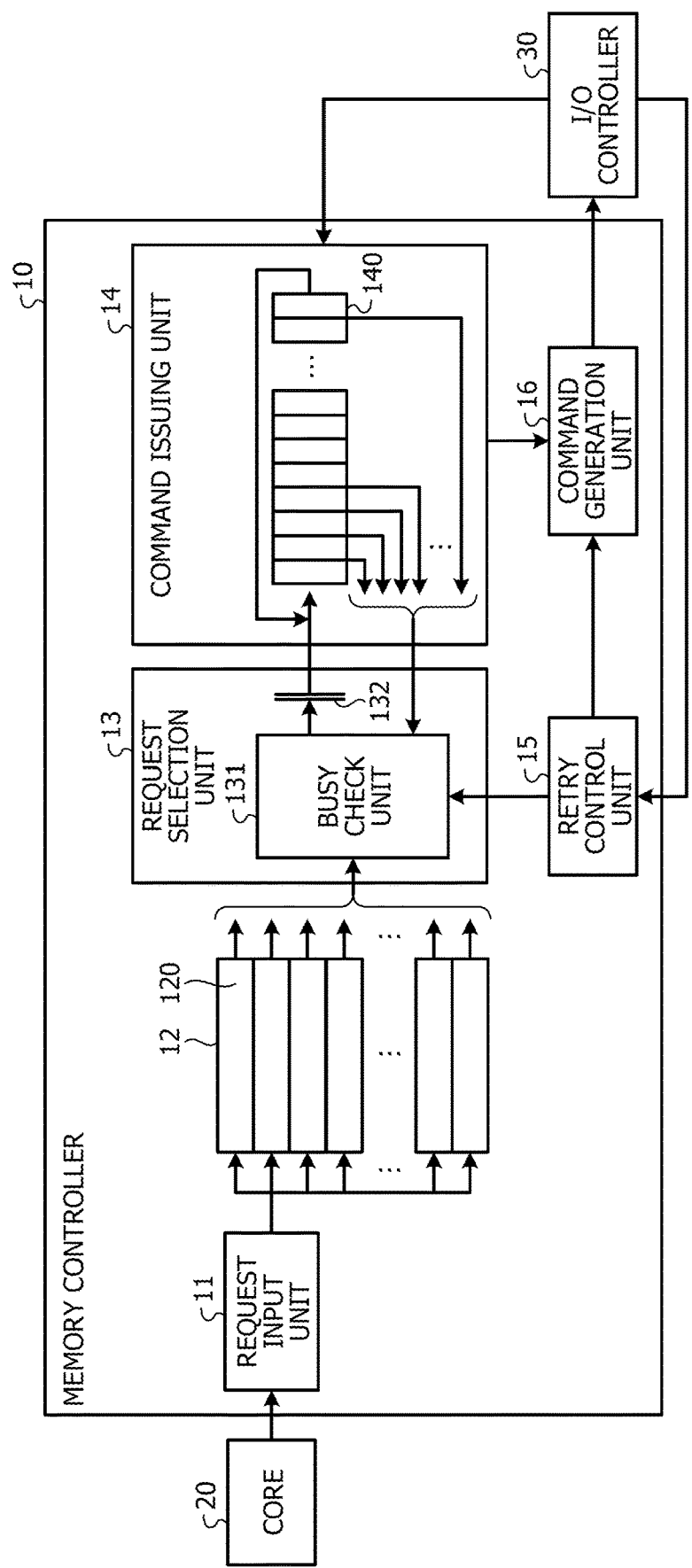
FIG. 4 is a schematic diagram of the memory controller.

FIG. 4 is a schematic diagram of the memory controller. The memory controller 10 includes a request input unit 11, a request queue 12, a request selection unit 13, a command issuing unit 14, a retry control unit 15, and a command generation unit 16.

The request input unit 11 receives a memory access request from the core 20. Next, the request input unit 11 searches the request queue 12 for a free entry. Then, the request input unit 11 stores the received new request in the detected free entry.

The request queue 12 has multiple entries 120. The request queue 12 is a queue for storing requests to be processed to execute the request processing out of order.

FIG. 5 is a diagram illustrating contents of each entry in the request queue. As illustrated in FIG. 5, each of the entries 120 in the request queue 12 stores a Valid flag, a command, and an address. The Valid flag is a flag indicating whether each of the entries 120 is valid or invalid. The entry 120 whose Valid flag is invalid is a free entry. For example, the request input unit 11 is enabled to confirm whether or not each of the entries 120 is a free entry by checking the Valid flag. Furthermore, the command is information indicating either read or write. Furthermore, the address is information indicating a memory address to be accessed.

Returning to FIG. 4, description will continue. When the request queue 12 stores a new request, it sets the Valid flag to valid. Then, the request queue 12 notifies a busy check unit 131 of the request selection unit 13 of address information indicating the memory address to be accessed by the new request.

Thereafter, when the request queue 12 receives request issuance notification from the busy check unit 131 of the request selection unit 13, it deletes the notified request from the entry 120 and sets the Valid flag to invalid. As a result, the request is retired, and the request queue 12 is enabled to put the entry 120 storing the request specified by the request issuance notification into a reusable state. In this manner, in the memory controller 10 according to the present embodiment, the request is retired from the request queue 12 when the busy check is cleared and the request enters into the request pipeline 140 to start the processing. For example, the request does not leave any information outside the request pipeline 140 after the processing has started.

The request selection unit 13 selects one request from the requests stored in the individual entries 120 in the request queue 12, and outputs it to the command issuing unit 14 for processing. As illustrated in FIG. 4, the request selection unit 13 includes the busy check unit 131 and a selection circuit 132.

The busy check unit 131 receives notification regarding the address information of the requests to be processed from the request queue 12. Furthermore, the busy check unit 131 receives notification regarding the address information of the processed requests from the request pipeline 140 of the command issuing unit 14. Then, the busy check unit 131 compares the history of the obtained address information of the requests to be processed with the history of the obtained address information of the processed requests, and extracts accessible requests. Then, the busy check unit 131 obtains information regarding the extracted requests from the request queue 12, and outputs it to the selection circuit 132.

Furthermore, the busy check unit 131 receives retry busy notification from the retry control unit 15. In that case, the busy check unit 131 stops processing of all new requests. For example, the busy check unit 131 receives the retry busy notification when a value of a retry busy signal input from the retry control unit 15 is "1", and the retry busy notification is canceled when the value of the retry busy signal is "0".

The busy check unit 131 determines that the request selected by the selection circuit 132 and input to the request pipeline 140 of the command issuing unit 14 has been processed. Then, the busy check unit 131 outputs, to the selection circuit 132, the request issued to the request queue 12.

The selection circuit 132 receives an input of the accessible requests from the busy check unit 131. Next, the selection circuit 132 performs arbitration of the obtained requests to select one request out of order. Thereafter, the selection circuit 132 inputs the selected request to the request pipeline 140 of the command issuing unit 14.

The command issuing unit 14 processes the request issued from the request selection unit 13, determines conversion of the request into a command, and instructs the command generation unit 16 to generate a command. The command issuing unit 14 includes the request pipeline 140.

The request pipeline 140 is a shift register with multiple stages. In the request pipeline 140, the request input from the request selection unit 13, for example, the request determined by the busy check unit 131 to have been processed, is stored in the first stage. Each stage number in the request pipeline 140 corresponds to the elapsed time from the processing start. The request pipeline 140 performs pipeline processing on requests to perform busy management of addresses of stored requests, management of command issuance timing to the DIMM 3, management of command processing completion using the retry window, and the like.

When a request is stored in a predetermined stage and predetermined timing is reached from the request processing start, the request pipeline 140 notifies the command generation unit 16 of command issuance notification regarding the request.

FIG. 6 is a diagram illustrating information stored in each stage of the request pipeline. As illustrated in FIG. 6, each stage of the request pipeline 140 stores a Valid flag, a command, an address, a sequence number, and a complete flag.

The valid flag is information indicating whether or not request information is stored in each stage. In the present embodiment, the request information is stored when a value of the Valid flag of the request pipeline 140 is "1", and the request information is not stored when the value is "0". The command is information indicating either read or write specified by a request. Furthermore, the address is information indicating a memory address to be accessed. Furthermore, the sequence number is an identifier for distinguishing a request before and after a retry assigned to a request, and is information indicating the number of retries of the request. The sequence number has an initial value of 0, and is incremented by 1 each time the retry is repeated. For example, the sequence number represents the number of executed retries. Furthermore, the complete flag is information indicating that the request has exceeded the retry window so that the processing completion is guaranteed and the retry is no longer needed. The complete flag guarantees the processing completion when the value is "1", and indicates that the processing is unprocessed when the value is "0".

FIG. 7 is a block diagram of the command issuing unit. Hereinafter, details of the command issuing unit 14 will be described with reference to FIG. 7. The command issuing unit 14 includes the request pipeline 140, a re-input unit 141, and a stop flag management unit 142. Furthermore, here, the request pipeline 140 includes a retry window 400 after the 11th stage.

The stop flag management unit 142 includes a stop flag. The stop flag indicates a stoppage of shift operation of the request pipeline 140 when a value is "1", and indicates execution of the shift operation when the value is "0".

The stop flag management unit 142 receives an input of a stop enable signal and a stop number. Furthermore, the stop flag management unit 142 obtains the value of the complete flag and the sequence number of the request in the final stage of the request pipeline 140. Then, the stop flag management unit 142 sets a value of the stop flag based on the stop enable signal, the stop number, the sequence number, and the complete flag. Hereinafter, details of the operation of the stop flag management unit 142 will be described.

In a state where no alert is generated, the stop flag management unit 142 receives an input of a value of 0, which is an initial value, as a stop enable signal from the retry control unit 15. The state where no alert is generated includes a state where no request is stored in the request pipeline 140 and a state where a previously generated alert has already been cleared. When an alert is generated, the stop flag management unit 142 receives an input of a stop enable signal with a value of "1" from the retry control unit 15. The stop enable signal is a signal that permits setting the value of the stop flag to "1". As a result, the stop flag management unit 142 enters a state of being allowed to stop the shift operation of the request pipeline 140.

Furthermore, in a state where no alert is generated, the stop flag management unit 142 receives an input of 0, which is an initial value, as a stop number from the retry control unit 15. Then, when a CAPE occurs and the shift operation of the request pipeline 140 resumes after being stopped, the stop flag management unit 142 receives an input of the stop number incremented by one from the retry control unit 15. For example, after an alert is generated in a state where no alert is generated, the stop flag management unit 142 receives an input of the stop number with a value of "1" from the retry control unit 15. Thereafter, in a case where another alert is generated before processing of all requests to be retried is complete, the request pipeline 140 receives an input of the stop number with a value of "2" from the retry control unit 15. In this manner, when alerts overlap while the processing of all the requests to be retried is not complete, the stop number to be received by the request pipeline 140 is incremented by one. The stop number is information for determining whether the request to be retried by the latest alert has reached the final stage after the shift of the request pipeline 140 is temporarily stopped and then resumed. For example, the stop number is information for determining whether or not a request other than the request to be retried by the latest alert does not exist in the request pipeline 140 anymore.

The stop flag management unit 142 sets the value of the stop flag to "1" when the following shift stop condition is satisfied. The shift stop condition is a condition that, for the request in the final stage of the request pipeline 140, the value of the stop enable signal is "1", the stop number matches the sequence number, and the value of the complete flag is "0". By setting the value of the stop flag to "1", the stop flag management unit 142 allows the request waiting for the retry input to the request pipeline 140 to stay in the pipeline, and causes the retry control unit 15 to perform the processing related to the retry. Furthermore, the stop flag management unit 142 notifies the retry control unit 15 of the fact that the value of the stop flag has been set to "1".

Furthermore, the stop flag management unit 142 sets the value of the stop flag to "0" when the shift stop condition is no longer satisfied. The stop flag management unit 142 causes the request pipeline 140 to resume the processing related to the retry by resetting the value of the stop flag to "0".

The request pipeline 140 outputs the logical sum of all Valid flag values of the individual stages to the retry control unit 15 for each shift operation. For example, the request pipeline 140 outputs "0" when all the stages are empty, and outputs "1" when even one request exists in any stage. In this manner, the request pipeline 140 notifies the retry control unit 15 of the logical sum of all the Valid flag values of the individual stages to make notification of the emptiness.

The request pipeline 140 receives a request input from the request selection unit 13. At a time of storing information regarding the request input from the request selection unit 13 in the first stage, the request pipeline 140 sets the value of the Valid flag to "1", and stores the address. Moreover, the request pipeline 140 sets the sequence number to "0", and sets the value of the complete flag to "0". Then, the request pipeline 140 shifts the request stored in the first stage to the next stage by one clock.

When a CAPE occurs, the request pipeline 140 stops the request input from the request selection unit 13.

In a state where the DIMM 3 does not output an alert signal, the request pipeline 140 receives an input of 0, which is the initial value, as a retry number from the retry control unit 15. When the CAPE occurs and the DIMM 3 outputs the alert signal, the request pipeline 140 receives an input of the retry number incremented by one from the retry control unit 15. For example, when the first CAPE occurs and the DIMM 3 outputs the alert signal, the request pipeline 140 receives an input of the retry number with a value of "1" from the retry control unit 15. Thereafter, in a case where the DIMM 3 outputs the next alert signal before the processing of all requests to be retried is complete, the request pipeline 140 receives an input of the retry number with a value of "2" from the retry control unit 15. In this manner, when occurrence of the CAPE overlaps before the processing of all the requests to be retried is complete, the retry number received by the request pipeline 140 is incremented by one. The retry number represents the number of retries to be executed.

Then, when requests exceed the retry window 400, for example, for the request that reaches the 12th stage, the request pipeline 140 compares the sequence number with the retry number. For example, the request pipeline 140 compares the number of executed retries with the number of retries to be executed. In a case where the sequence number matches the retry number, for example, in a case where the number of executed retries reaches the number of retries to be executed, the request pipeline 140 sets the value of the complete flag of the request stored in the 12th stage to "1".

On the other hand, in a case where the sequence number does not match the retry number, the request pipeline 140 keeps the value of the complete flag as "0". In a case where the first CAPE occurs and the DIMM 3 outputs the alert signal, the sequence number is "0", and the retry number is "1". In this case, the sequence number does not match the retry number, and the request pipeline 140 keeps the value of the complete flag as "0", accordingly. Similarly, in a case where the DIMM 3 further outputs an alert signal while the first retry is being performed, the sequence number is "1", and the retry number is "2" as it is the second retry. In this case as well, the sequence number does not match the retry number, and the request pipeline 140 keeps the value of the complete flag as "0", accordingly. On the other hand, in a case where no alert signal is output from the DIMM 3 while a retry of any number of times is being performed, the sequence number is the number of retries, and the sequence number matches the number of retries. Accordingly, the sequence number matches the retry number in this case, and the request pipeline 140 sets the value of the complete flag to "1", accordingly.

Thereafter, when a request reaches the final stage, the request pipeline 140 outputs the request to the re-input unit 141 at the next shift timing when the value of the complete flag of the request is "1".

On the other hand, when a request whose value of the complete flag is "0" reaches the final stage, the value of the stop flag is set to "1" when the value of the stop enable signal is "1", and each stage of the request pipeline 140 is notified of a shift inhibition signal. This causes each stage of the request pipeline 140 to stop the shift operation. Then, the request pipeline 140 is maintained in the state where the request to be retried has reached the final stage.

Thereafter, when the value of the stop flag is returned to "0", the request pipeline 140 resumes the shift operation with the stoppage of the shift operation disabled, and outputs the request whose value of the complete flag is "0" in the final stage to the re-input unit 141.

When the processing of all the requests to be retried is complete without occurrence of the next CAPE during the retry execution, the request pipeline 140 becomes empty. Thereafter, the new request input from the request selection unit 13 to the request pipeline 140 resumes. This completes the retry process.

The re-input unit 141 receives an input of the request information of the final stage from the request pipeline 140. Then, the re-input unit 141 confirms the value of the complete flag. In a case where the value of the complete flag is "1", the re-input unit 141 discards and retires the request.

On the other hand, in a case where the value of the complete flag is "0", the re-input unit 141 increments the sequence number of the obtained request by one, and re-inputs it to the request pipeline 140. The re-input request whose sequence number is incremented by one is stored in the first stage of the request pipeline 140. The re-input unit 141 sequentially increments the sequence numbers of all the subsequent requests to be retried remaining in the request pipeline 140 by one, and re-inputs them.

In this manner, when an alert is generated, the request pipeline 140, the re-input unit 141, and the stop flag management unit 142 repeat the processing at the time of alert generation. For example, in a case where two alerts overlap, the request pipeline 140, the re-input unit 141, and the stop flag management unit 142 execute the processing described above in the state where the retry number is "2", the stop number is "1", and the sequence number is "1".

When a CAPE occurs, the retry control unit 15 receives an alert signal from the DIMM 3, and is notified of the occurrence of the CAPE. Then, the retry control unit 15 performs a retry process on the request in which the CAPE has occurred and the subsequent requests stored in the request pipeline 140. Since the information exists in the request pipeline 140 after the start of the request processing in the memory controller 10 according to the present embodiment, the retry control unit 15 reuses the information existing in the request pipeline 140 to perform the retry process.

The retry control unit 15 receives the alert signal transmitted from the DIMM 3 via the I/O controller 30. Next, the retry control unit 15 transmits retry busy notification to the busy check unit 131 via the I/O controller 30 to suppress new request processing. Moreover, the retry control unit 15 sets the value of the stop enable signal to "1", and transmits it to the stop flag management unit 142 to permit the shift operation of the request pipeline 140 to stop. Next, the retry control unit 15 waits until the request whose value of the complete flag is "0" in the request pipeline 140 reaches the final stage of the pipeline and the shift operation of the request pipeline 140 stops to enter a stop state. The retry control unit 15 receives notification from the stop flag management unit 142 indicating that the value of the stop flag is set to "1", and determines that the request pipeline 140 has entered the stop state.

When the request pipeline 140 enters the stop state, the retry control unit 15 issues a CAPE re-enable command to the DIMM 3 so that the DIMM 3 is enabled to receive a new command. After waiting for the DIMM 3 to enter the state of being enabled to receive a new command, the retry control unit 15 sets the value of the stop enable signal to "0", and transmits it to the stop flag management unit 142. As a result, the value of the stop flag becomes "0", and the retry control unit 15 causes the requests to be retried in the order starting from the final stage of the request pipeline 140. Thereafter, when the retry process of the requests to be retried is complete and the request pipeline 140 becomes empty, the retry control unit 15 cancels the retry busy signal input to the busy check unit 131 to resume the new request processing.

Figure 8:
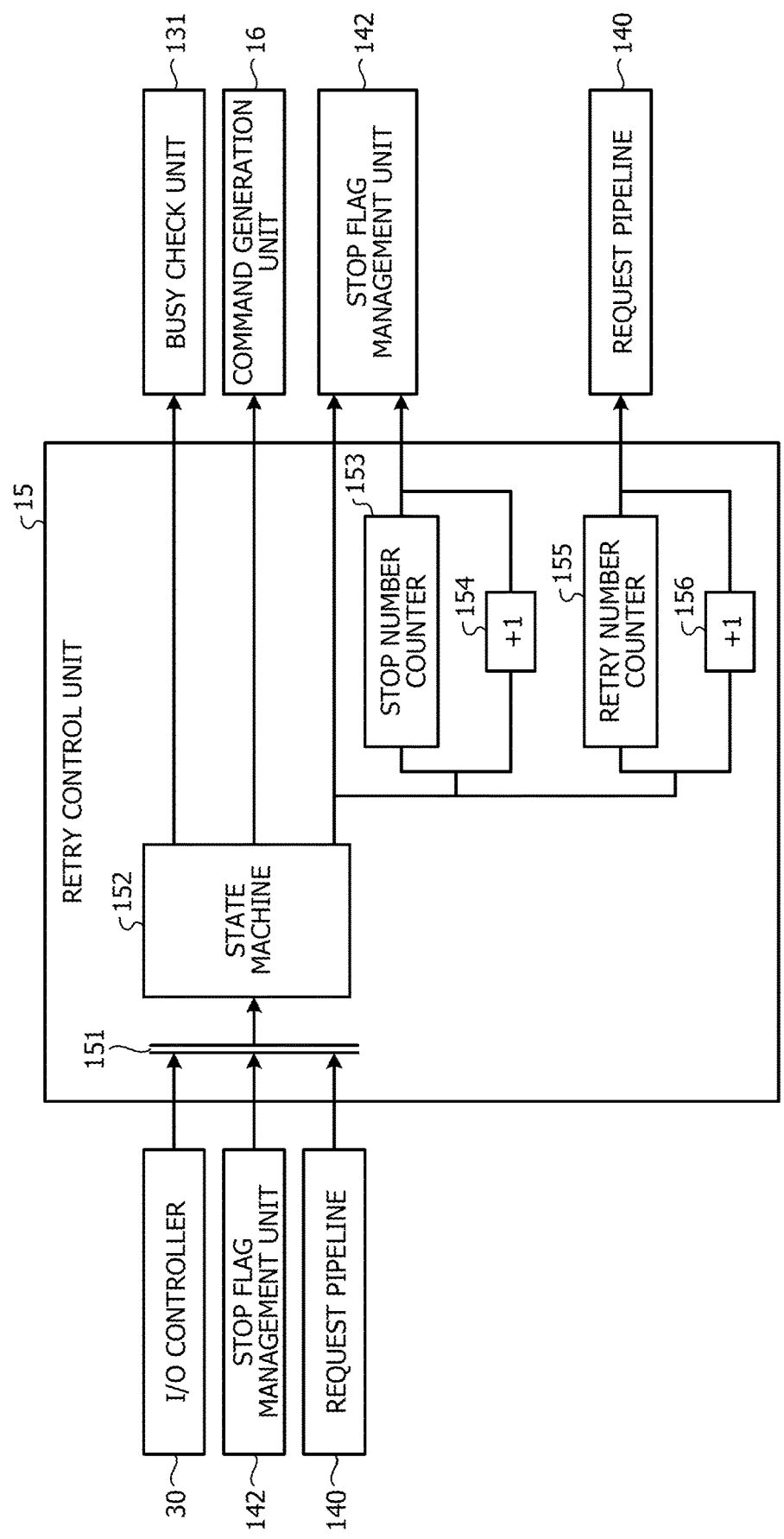
FIG. 8 is a block diagram of a retry control unit.

FIG. 8 is a block diagram of the retry control unit. Hereinafter, operation of the retry control unit 15 will be described in detail with reference to FIG. 8. The retry control unit 15 includes a selection circuit 151, a state machine 152, a stop number counter 153, an adder circuit 154, a retry number counter 155, and an adder circuit 156.

The selection circuit 151 outputs, to the state machine 152, an alert signal input from the I/O controller 30, a value of the stop flag input from the stop flag management unit 142, and a logical sum value of the Valid flags input from the request pipeline 140.

The stop number counter 153 manages a stop number in retry control. The stop number counter 153 has an initial value of 0. Thereafter, the stop number counter 153 receives an instruction to increment the counter from the state machine 152 that has confirmed the stoppage and restart of the shift operation of the request pipeline 140. Then, the stop number counter 153 stores a value obtained by adding one to the current count value output from the adder circuit 154 as a new count value. The count value retained in the stop number counter 153 is output to the stop flag management unit 142 as a stop number.

The adder circuit 154 obtains the counter value output from the stop number counter 153. Then, the adder circuit 154 outputs a value obtained by adding one to the obtained counter value.

The retry number counter 155 manages a retry number in the retry control. Furthermore, the retry number counter 155 has an initial value of 0. Thereafter, the retry number counter 155 receives an instruction to increment the counter from the state machine 152 that has received the alert signal. Then, the retry number counter 155 stores a value obtained by adding one to the current count value output from the adder circuit 156 as a new count value. The count value retained in the retry number counter 155 is output to the request pipeline 140 as a retry number. In a case of first alert generation, the retry number changes from 0 to 1. Thereafter, it changes to 2, 3, and so on when an alert is generated again during the retry. Thereafter, when the request pipeline 140 becomes empty, the retry number counter 155 receives reset notification from the state machine 152 to reset the count value to the initial value of 0.

The adder circuit 156 obtains the counter value output from the retry number counter 155. Then, the adder circuit 156 outputs a value obtained by adding one to the obtained counter value.

The state machine 152 is a circuit that manages a retry flow and generates each control signal. The state machine 152 is in a stand-by state when no CAPE occurs. When a CAPE occurs, the state machine 152 receives an input of an alert signal from the I/O controller 30 via the selection circuit 151. Then, the state of the state machine 152 transitions to a "stop-waiting state". When the state transitions to the stop-waiting state, the state machine 152 transmits retry busy notification to the busy check unit 131 via the I/O controller 30. For example, the state machine 152 transmits a retry busy signal with a value of "1" to the busy check unit 131 to make retry busy notification. Moreover, the state machine 152 outputs an instruction to increment the counter to the retry number counter 155.

Thereafter, when the request whose value of the complete flag is "0" reaches the final stage of the request pipeline 140, the state machine 152 receives an input of the stop flag whose value is set to "1". When the value of the stop flag is "1", it indicates that all the requests whose processing staying in the request pipeline 140 has been complete, for example, the requests having the complete flag value "1", have retired from the request pipeline 140. For example, when the value of the stop flag is "1", it is indicated that the request to be retried is retained in the request pipeline 140. Accordingly, when confirming that the value of the stop flag has become "1", the state machine 152 causes the state to transition to an "alert cancellation waiting state". When the transition to the alert cancellation waiting state is made, the state machine 152 instructs the command generation unit 16 to generate a CAPE re-enable command. As a result, the state machine 152 issues a CAPE re-enable command to the DIMM 3 to cancel the alert.

Since the DIMM 3 is enabled to accept a new command when the alert is canceled, the state machine 152 causes the state to transition to a "retry state". When the transition to the retry state is made, the state machine 152 starts retrying the request to be retried. For example, the state machine 152 sets the value of the stop enable signal to "0", and outputs it to the stop flag management unit 142 to resume the shift operation of the request pipeline 140. Furthermore, the state machine 152 outputs an instruction to increment the counter to the stop number counter 153. The state machine 152 causes the stop flag management unit 142 to set the value of the stop flag to "0" to resume the shift operation of the request pipeline 140.

Furthermore, in a case where the state machine 152 receives an alert signal in either the stop-waiting state or the retry state, it returns to the stop-waiting state to perform the process again.

In the retry state, the state machine 152 monitors the logical sum value of the Valid flags input from the request pipeline 140 to determine whether the processing of all the requests to be retried is complete. When the input of "0" is received as a logical sum of the Valid flags, the state machine 152 resets the state to the stand-by state. Then, the state machine 152 cancels the retry busy output to the busy check unit 131 to resume the new request processing. For example, the state machine 152 transmits a retry busy signal with a value of "0" to the busy check unit 131 to cancel the retry busy.

The command generation unit 16 receives command issuance notification from the command issuing unit 14. For example, the command generation unit 16 receives notification regarding the issuance of a read command, a write command, or a CAPE re-enable command. Then, the command generation unit 16 generates a command specified by the command issuance notification. Thereafter, the command generation unit 16 issues the generated command to the I/O controller 30.

Figure 9:
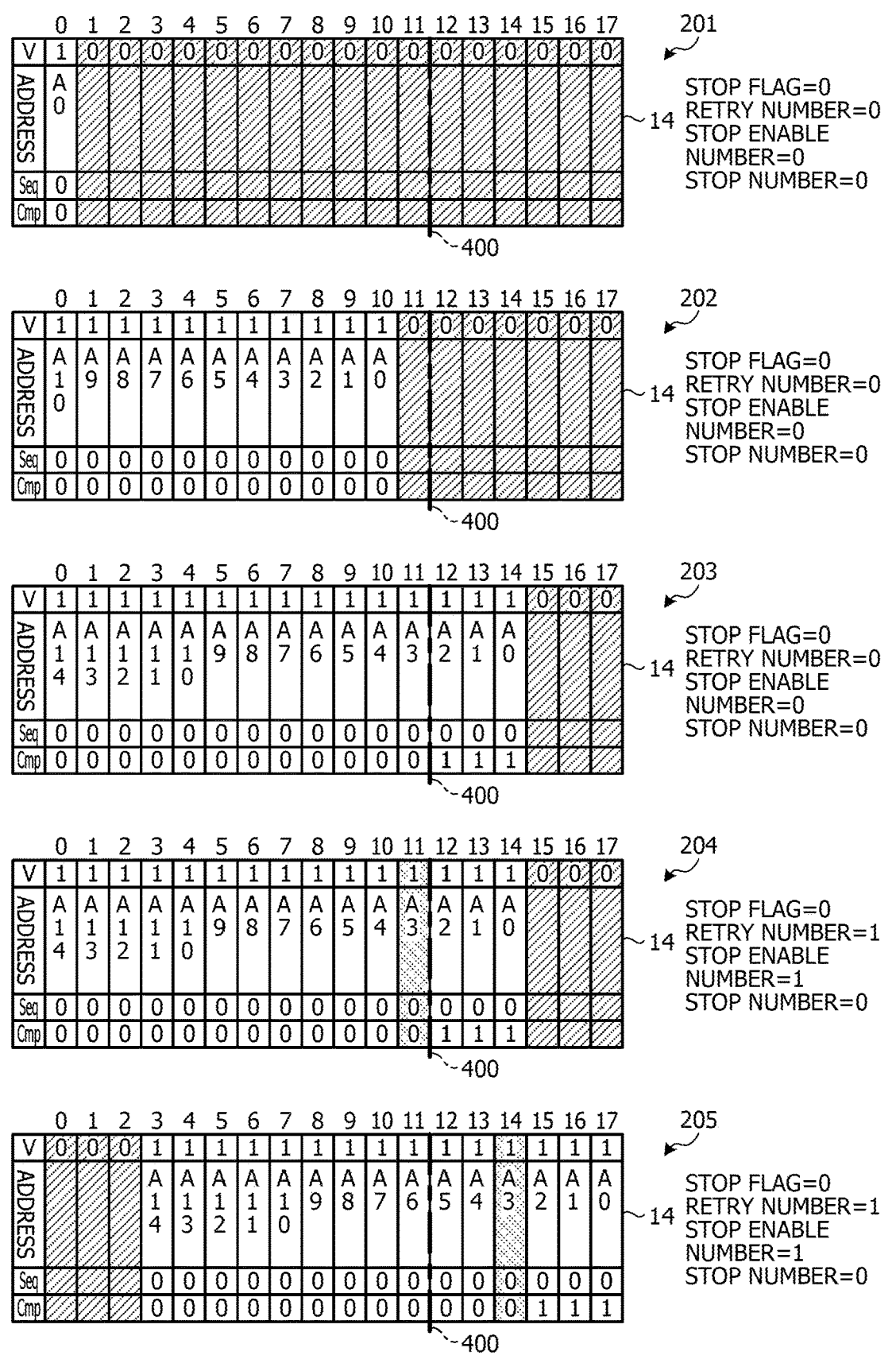
Figure 10:
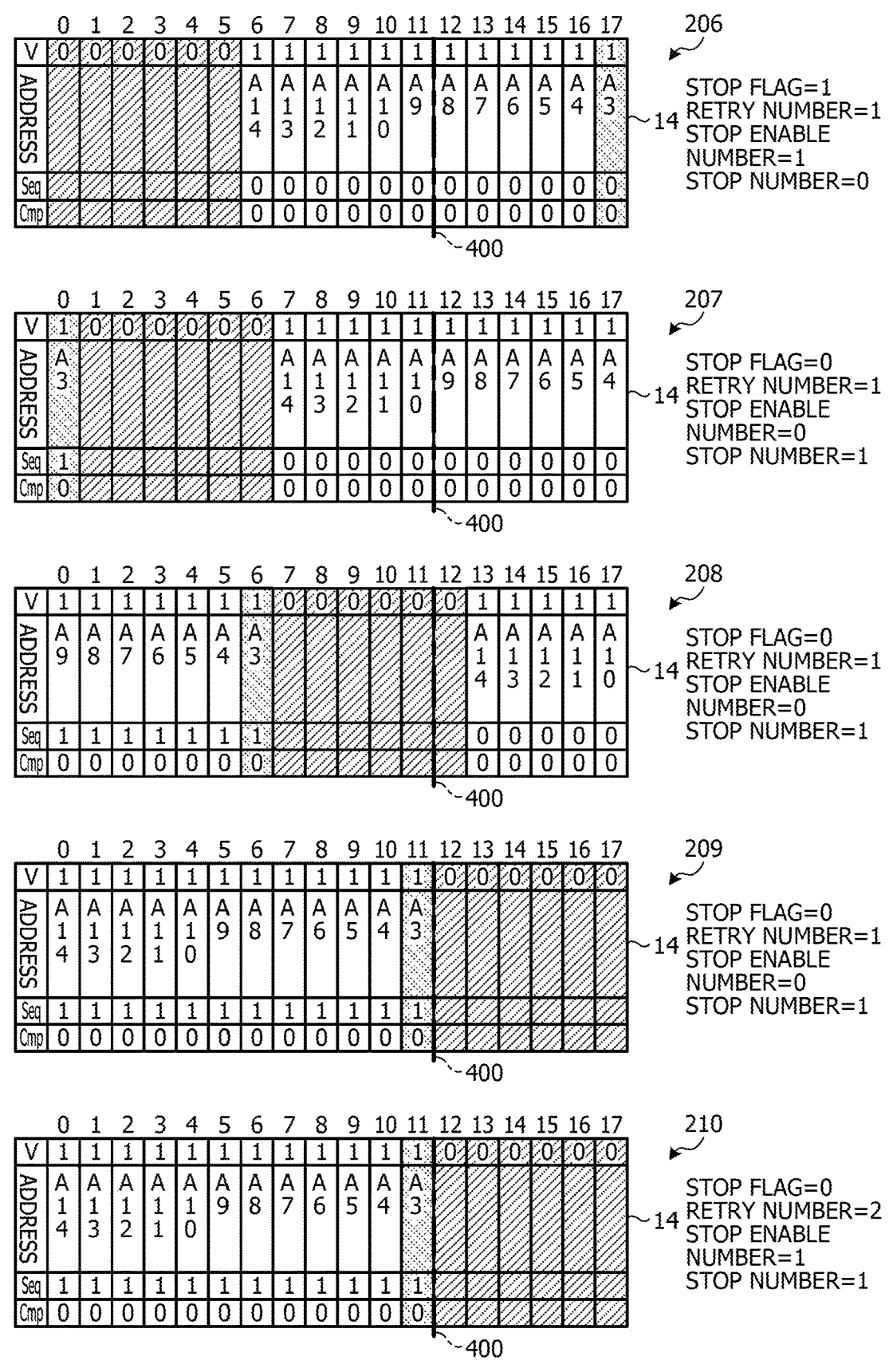

FIG. 9 is a first diagram for explaining the shift operation of the request pipeline. FIG. 10 is a second diagram for explaining the shift operation of the request pipeline. FIG. 11 is a third diagram for explaining the shift operation of the request pipeline. Next, the shift operation of the request pipeline 140 according to the present embodiment during the retry process will be described with reference to FIGS. 9 and 11. In FIGS. 9 to 11, individual values of the stop flag, the retry number, the stop enable signal, and the stop number written next to the request pipeline 140 indicate individual values in the corresponding state of the request pipeline 140.

A state 201 is a state in which the first request is set in the request pipeline 140. In the state 201, the value of the stop flag is "0", the retry number is "0", the value of the stop enable signal is "0", and the stop number is "0". These are all initial values. Furthermore, a value of the Valid flag is set to "1" in the zeroth stage storing request information. Furthermore, the request in the zeroth stage has the sequence number set to "0", and a value of the complete flag set to "0".

After the state 201, the request pipeline 140 sequentially receives request inputs subsequently. A state 202 is a state in which the request pipeline 140 is processing 11 requests in succession. A value of the Valid flag of the zeroth to 11th stages storing the request information is set to "1". Furthermore, in both cases, the sequence number is set to "0", and a value of the complete flag is set to "0". Furthermore, each of the requests in the zeroth to 11th stages has the sequence number set to "0" and a value of the complete flag set to "0".

When further requests are input to the request pipeline 140 from the state 202, the requests exceed the retry window 400 in order from the top. A state 203 is a state in which the preceding three requests have exceeded the retry window 400. For the requests that have exceeded the retry window 400, a value of the complete flag is set to "1" as the command processing has been complete.

A state 204 is a state in which a CAPE has occurred in the request stored in the 11th stage in the state 203. When a CAPE occurs, the retry control unit 15 receives an alert signal, increments the retry number to set the value to "1", and outputs it to the request pipeline 140. Furthermore, the retry control unit 15 sets a value of the stop enable signal to "1", and outputs it to the stop flag management unit 142. At this time, the retry control unit 15 transmits retry busy notification to the busy check unit 131 to stop the new request input.

After the state 204, the request pipeline 140 continues the shift operation in a state where no new request is input. A state 205 is a state in which the leading request whose command processing has been complete has reached the final stage. In this case, since no new request is input, the stages from the zeroth to the shifted stage are empty. Furthermore, since the retry number of subsequent requests including the request in which the CAPE has occurred is "1" and the sequence number is "0", the complete number remains "0" even when the retry window 400 is exceeded. The shift continues from this state, and the requests stored in the 15th to 17th stages in the state 205 are retired by the re-input unit 141 as the complete number is "1".

A state 206 is a state in which the top of the requests to be retried has reached the final stage. Since the complete flag of the request in the final stage is "0", the value of the stop enable signal is "1", and the value of the stop flag and the sequence number match as they are both "0", the stop flag management unit 142 sets a value of the stop flag to "1". When the value of the stop flag becomes "1", the request pipeline 140 stops the shift operation. Upon reception of the notification indicating that the value of the stop flag is "1", the retry control unit 15 issues a CAPE re-enable command to the DIMM 3. As a result, the DIMM 3 enters a state of being enabled to receive a new command. Then, the retry control unit 15 sets the value of the stop enable signal to "0", and outputs it to the stop flag management unit 142.

When the request pipeline 140 resumes the shift operation after the state 206, the retry control unit 15 increments the stop number to set it to "1", and outputs it to the stop flag management unit 142. The re-input unit 141 obtains the request stored in the final stage in the state 206, and re-inputs it to the request pipeline 140 as the value of the complete flag is "0". A state 207 is a state in which the top request to be retried has been re-input. In this case, the value of the stop flag is "0", the retry number is "1", the value of the stop enable signal is "0", and the stop number is "1".

After the state 207, the re-input unit 141 subsequently repeats the re-input of the request to be retried. A state 208 is a state in which six requests to be retried subsequent to the top request to be retried have been re-input.

The re-input of the request to be retried is further repeated after the state 208, and the top request to be retried reaches the retry window 400, whereby the request pipeline 140 enters a state 209.

A state 210 is a state in which a CAPE has occurred in the request stored in the 11th stage in the state 209. When a CAPE occurs in the state 209, the retry control unit 15 receives an alert signal, increments the retry number to set the value to "2", and outputs it to the request pipeline 140. Furthermore, the retry control unit 15 sets a value of the stop enable signal to "1", and outputs it to the stop flag management unit 142. At this time, the retry control unit 15 transmits retry busy notification to the busy check unit 131 to stop the new request input. Thereafter, the request pipeline 140 continues the shift operation while the new request input is stopped. In this case, even when the retry window 400 is exceeded, the value of the complete flag of the request to be retried remains "0".

A state 211 is a state in which the top request to be retried in the second retry has reached the final stage. Since the complete flag of the request in the final stage is "0", the value of the stop enable signal is "1", and the value of the stop flag and the sequence number match as they are both "1", the stop flag management unit 142 sets the value of the stop flag to "1". When the value of the stop flag becomes "1", the request pipeline 140 stops the shift operation. Upon reception of the notification indicating that the value of the stop flag is "1", the retry control unit 15 issues a CAPE re-enable command to the DIMM 3. As a result, the DIMM 3 enters a state of being enabled to receive a new command. Then, the retry control unit 15 sets the value of the stop enable signal to "0", and outputs it to the stop flag management unit 142.

When the request pipeline 140 resumes the shift operation after the state 211, the retry control unit 15 increments the stop number to set it to "2", and outputs it to the stop flag management unit 142. The re-input unit 141 obtains the request stored in the final stage in the state 211, and re-inputs it to the request pipeline 140 as the value of the complete flag is "0". A state 212 is a state in which the top request to be retried in the second retry has been re-input. In this case, the value of the stop flag is "0", the retry number is "2", the value of the stop enable signal is "0", and the stop number is "2".

After the state 212, the re-input unit 141 subsequently repeats the re-input of the request to be retried in the second retry. A state 213 is a state in which six requests to be retried subsequent to the top request to be retried in the second retry have been re-input. In this case, the value of the stop flag is "0", the retry number is "2", the value of the stop enable signal is "0", and the stop number is "2", which remains unchanged.

The re-input of the request to be retried in the second retry is further repeated after the state 213, and the top request to be retried exceeds the retry window 400. At this time, when no CAPE occurs, the request pipeline 140 sets a value of the complete flag of the request that has exceeded the retry window 400 to "1" as the sequence number of the request to be retried and the retry number are both "2". Thereafter, the top request to be retried in the second retry reaches the final stage, and the request pipeline 140 enters a state 214.

Thereafter, the re-input unit 141 obtains the top request to be retried stored in the final stage, confirms that the value of the complete flag is "1", and retires it. When all the requests to be retried are retired, the request pipeline 140 enters a state 215. The request pipeline 140 in the state 215 outputs "0" to the retry control unit 15 as a logical sum of the Valid flag values. The retry control unit 15 cancels the retry busy notified to the busy check unit 131 upon reception of the input of the value "0" as the logical sum of the Valid flag values. As a result, the new request input to the request pipeline 140 resumes.

Figure 12:
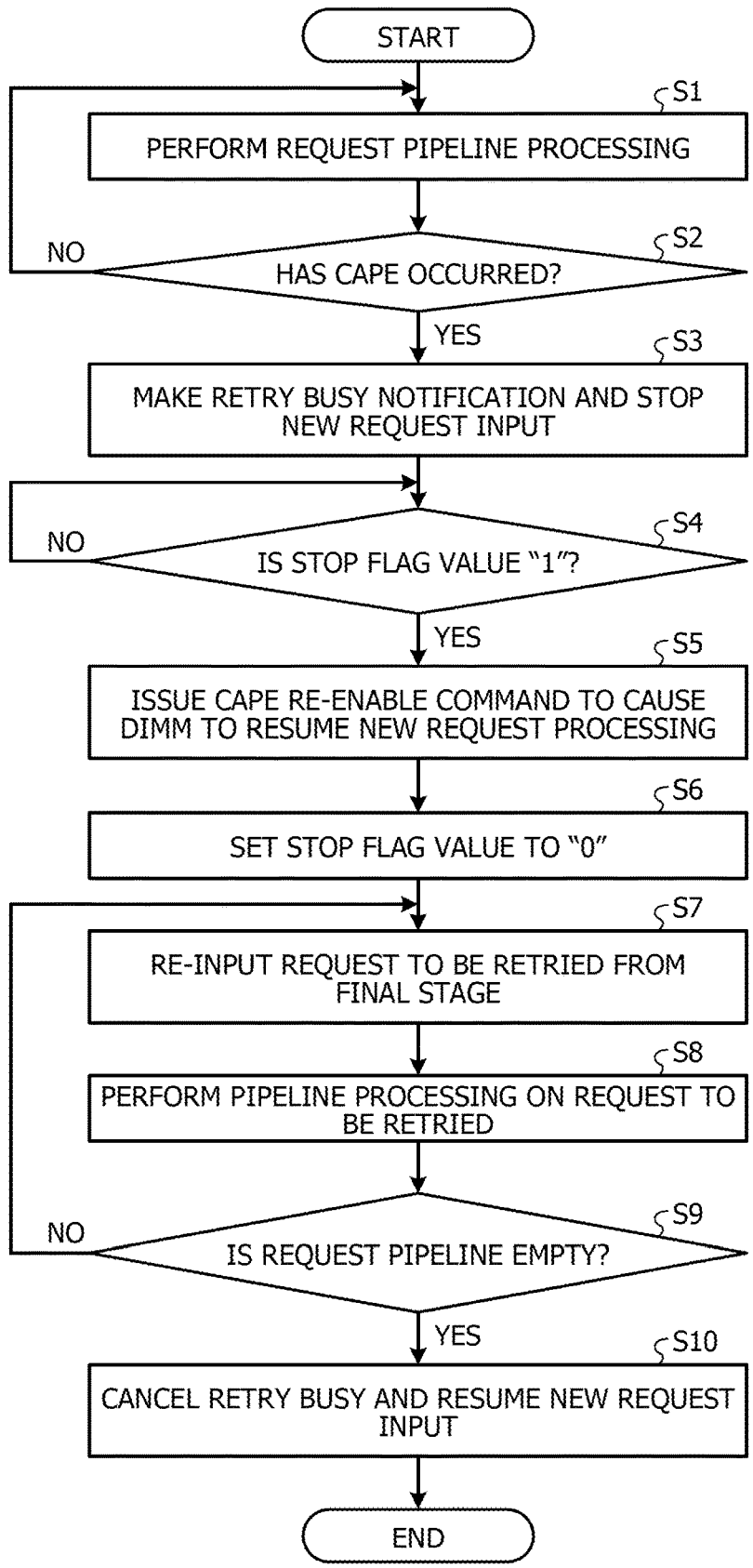
FIG. 12 is a flowchart of an outline of a retry process performed by the memory controller according to an embodiment.

FIG. 12 is a flowchart of an outline of the retry process performed by the memory controller according to the embodiment. Next, a flow of the retry process performed by the memory controller 10 according to the present embodiment will be described with reference to FIG. 12. Here, an exemplary case where CAPE occurrences do not overlap will be described.

The request selection unit 13 and the request pipeline 140 perform request pipeline processing (step S1).

The retry control unit 15 determines whether or not a CAPE has occurred during the execution of the request pipeline processing based on presence or absence of an alert signal (step S2). If no CAPE has occurred (No in step S2), the process returns to step S1 to continue the request pipeline processing.

On the other hand, if a CAPE has occurred (Yes in step S2), the retry control unit 15 notifies the busy check unit 131 of retry busy, and stops new request input to the request pipeline 140 (step S3). While the new request input is stopped, the request pipeline 140 shifts the stored requests.

Next, the retry control unit 15 determines whether or not the value of the stop flag is "1" (step S4). Here, when the request to be retried is stored in the final stage, the value of the stop flag is set to "1" by the stop flag management unit 142. If the value of the stop flag is not "1" (No in step S4), the retry control unit 15 stands by until the request to be retried reaches the final stage and the value of the stop flag is set to "1". The request pipeline 140 repeats the shift operation of the stored requests.

If the value of the stop flag is "1" (Yes in step S4), the retry control unit 15 issues a CAPE re-enable command to the DIMM 3 to resume the new command processing by the DIMM 3 (step S5). Furthermore, with the value "1" of the stop flag, the shift operation of the request pipeline 140 stops.

Next, the retry control unit 15 sets a value of the stop enable signal to "0", thereby causing the stop flag management unit 142 to change the value of the stop flag to "0" (step S6). As a result, the retry control unit 15 resumes the shift operation of the request pipeline 140.

Next, the re-input unit 141 re-inputs the requests to be retried to the request pipeline 140 from the final stage (step S7).

The request pipeline 140 shifts the requests to be retried in order from the top, and performs the pipeline processing (step S8).

Thereafter, the retry control unit 15 determines whether or not the request pipeline 140 is empty by the logical sum of the Valid flag values input from the request pipeline 140 (step S9). If the requests to be retried remain in the request pipeline 140 (No in step S9), the retry process returns to step S7.

On the other hand, if the request pipeline 140 is empty (Yes in step S9), the retry control unit 15 cancels the retry busy notified to the busy check unit 131, and resumes the new request input to the request pipeline 140 (step S10).

FIG. 13 is a flowchart of the retry process performed by the retry control unit and the request pipeline. Next, a flow of the retry process performed by the retry control unit 15 and the request pipeline 140 will be described by adding states of the state machine 152 and values of individual signals and numbers with reference to FIG. 13.

At the start of the request pipelining processing, the state of the state machine 152 is a "stand-by state". Then, the state machine 152 sets the retry number to "0", and outputs it to the request pipeline 140. Furthermore, the state machine 152 sets a value of the stop enable signal to "0", sets the stop number to "0", and outputs them to the stop flag management unit 142. Furthermore, the state machine 152 sets a value of the retry busy signal to "0", and outputs it to the busy check unit 131. Furthermore, the request pipeline 140 sets the sequence number of the input request to "0" (step S101).

While the request pipelining processing continues, the state machine 152 determines whether or not an alert signal is received from the DIMM 3 (step S102). If the alert signal is not received (No in step S102), the process returns to step S101.

On the other hand, if the alert signal is received (Yes in step S102), the state of the state machine 152 transitions to the "stop-waiting state". Then, the state machine 152 increments the retry number, and outputs it to the request pipeline 140. Furthermore, the state machine 152 sets the value of the stop enable signal to "1", and outputs it to the stop flag management unit 142. Furthermore, the state machine 152 keeps the stop number "0". Furthermore, the state machine 152 sets the value of the retry busy signal to "1", and outputs it to the busy check unit 131. As a result, new request input to the request pipeline 140 stops. In this case, while no sequence number is set by the request pipeline 140 as no new request is input, the sequence numbers of the stored requests are all "0" (step S103).

Thereafter, the state machine 152 determines whether or not the value of the stop flag output from the stop flag management unit 142 has become "1" (step S104). If the value of the stop flag is not "1" (No in step S104), the process returns to step S103.

On the other hand, if the value of the stop flag is "1" (Yes in step S104), the state of the state machine 152 transitions to the alert cancellation waiting state. Then, the state machine 152 issues a CAPE re-enable command to the DIMM 3 to resume the new command processing by the DIMM 3.

Furthermore, the state machine 152 keeps the incremented retry number as it is. Furthermore, the state machine 152 keeps the value of the stop enable signal as "1", and outputs it to the stop flag management unit 142. Furthermore, the state machine 152 keeps the stop number "0". Furthermore, the state machine 152 keeps the value of the retry busy signal as "1", and outputs it to the busy check unit 131. In this case as well, while no sequence number is set by the request pipeline 140 as no new request is input, the sequence numbers of the stored requests are all "0" (step S105).

Then, the state machine 152 determines whether or not the alert has been canceled based on the state of the alert signal output from the DIMM 3 (step S106). If the alert has not been canceled (No in step S106), the state machine 152 stands by until the alert is canceled.

On the other hand, if the alert is canceled (Yes in step S106), the state of the state machine 152 transitions to the "retry state". Then, the state machine 152 keeps the incremented retry number as it is. Furthermore, the state machine 152 sets the value of the stop enable signal to "0", and outputs it to the stop flag management unit 142. As a result, the value of the stop flag is set to "0", and the request pipeline 140 resumes the shift operation. Furthermore, the state machine 152 increments the stop number, and outputs it to the stop flag management unit 142. Furthermore, the state machine 152 keeps the value of the retry busy signal as "1", and outputs it to the busy check unit 131. In this case as well, the request to be retried is re-input, and the request pipeline 140 increments the sequence number of the re-input request to be retried by one (step S107).

Thereafter, the state machine 152 determines whether or not the alert signal has been received from the DIMM 3 (step S108). If the alert signal has been received (Yes in step S108), the process returns to step S103.

On the other hand, if no alert signal is received (No in step S108), the state machine 152 determines whether or not the request pipeline 140 is empty based on the logical sum of the Valid flag values output from the request pipeline 140 (step S109). If the requests to be retried remain in the request pipeline 140 (No in step S109), the process returns to step S107.

On the other hand, if the request pipeline 140 is empty (Yes in step S109), the state of the state machine 152 transitions to the "stand-by state". Then, the state machine 152 sets the retry number to 0, sets the value of the stop enable signal to "0", sets the stop number to "0", and sets the value of the retry busy signal to "0" to reset all of them to the initial values. Since the retry busy is canceled, the new request input to the request pipeline 140 resumes. Then, the request pipeline 140 sets the sequence number of the input request to "0", and performs the pipeline processing (step S110).

As described above, when a CAPE occurs, the memory controller according to the present embodiment implements a command retry of requests subsequent to the request in which the error has occurred using the request information stored in the request pipeline. As a result, it becomes possible to implement the request retry process when the CAPE occurs without increasing the circuit scale of the request queue. It becomes possible to reduce the circuit scale of the request queue, and to improve the processing performance of the busy check to be executed out of order. Therefore, it becomes possible to improve the request processing performance while reducing the circuit scale.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A memory controller comprising:
  a request pipeline that receives an input of a request to a memory output from a processor core, stores the request, and causes the memory to process the request in order of storage;

a retry control circuit that stops a new request input to the request pipeline when an error occurs in the memory, and re-inputs, to the request pipeline, requests to be retried that includes the request in which the error has occurred and a subsequent request stored in the request pipeline;

a request queue that stores a plurality of the requests; and a busy check circuit that obtains the request that may be processed by the memory from the request queue, deletes the request from the request queue, and inputs the obtained request to the request pipeline.

2. The memory controller according to claim 1, wherein the retry control circuit puts the memory, which has stopped accepting the request due to the occurrence of the error, into a state of being enabled to accept the request, and re-inputs the requests to be retried.

3. The memory controller according to claim 1, wherein the retry control circuit resumes a new request input to the request pipeline when a retry of all of the requests to be retried is complete.

4. The memory controller according to claim 1, wherein
the request pipeline assigns, to the stored request, a sequence number that indicates a number of times that the re-input has been executed and a complete flag that indicates processing completion, and the retry control circuit generates a retry number that indicates a number of times of execution of the re-input, a stop enable signal that permits a stoppage of shift operation of the request pipeline, and a stop number for determining the request to be retried, and controls discard of the request stored in the request pipeline, the shift operation of the request pipeline, and the re-input on a basis of the retry number, the stop enable signal, the stop number, the sequence number, and the complete flag.

5. An information processing apparatus comprising:
a memory; and
a processor including a core and a memory controller;
wherein the memory controller includes:
a request pipeline that receives an input of a request to a memory output from a processor core, stores the request, and causes the memory to process the request in order of storage;

a retry control circuit that stops a new request input to the request pipeline when an error occurs in the memory, and re-inputs, to the request pipeline, requests to be retried that includes the request in which the error has occurred and a subsequent request stored in the request pipeline;

a request queue that stores a plurality of the requests; and a busy check circuit that obtains the request that may be processed by the memory from the request queue, deletes the request from the request queue, and inputs the obtained request to the request pipeline.

6. An information processing method performed by a computer, the method comprising:
inputting requests to a memory output from a processor core into a request queue that stores a plurality of requests;

obtaining a request that may be processed by the memory from the request queue;

deleting the request from the request queue, and inputting the obtained request to a request pipeline;

storing the request in the request pipeline;

causing the memory to process the request in order of storage;

stopping a new request input to the request pipeline when an error occurs in the memory, and re-inputting, to the request pipeline, requests to be retried that includes the request in which the error has occurred and a subsequent request stored in the request pipeline.

\* \* \* \* \*